United States Patent
Youn et al.

(10) Patent No.: US 8,243,689 B2
(45) Date of Patent: Aug. 14, 2012

(54) HANDOVER METHOD AND APPARATUS FOR PROVIDING MOBILE IPTV SERVICE OVER HETEROGENEOUS WIRELESS COMMUNICATION NETWORKS

(75) Inventors: Hee Yong Youn, Seongnam-si (KR); Kyung Tae Kim, Suwon-si (KR); Byung Jun Lee, Chuncheon-si (KR)

(73) Assignee: Sungkyunkwan University Foundation for Corporate Collaboration, Cheoncheon-Dong, Jangan-Gu, Suwon-Si, Gyeonggi-Do (KR)

( * ) Notice: Subject to any disclaimer, the term of this patent is extended or adjusted under 35 U.S.C. 154(b) by 324 days.

(21) Appl. No.: 12/712,340

(22) Filed: Feb. 25, 2010

(65) Prior Publication Data

US 2011/0206012 A1    Aug. 25, 2011

(30) Foreign Application Priority Data

Feb. 22, 2010   (KR) ........................ 10-2010-0015905

(51) Int. Cl.
    *H04W 4/00* (2009.01)
(52) U.S. Cl. ........ 370/332; 370/331; 370/338; 455/436; 455/456.1

(58) Field of Classification Search ................... 370/332, 370/331, 338; 455/436, 456.1
See application file for complete search history.

(56) References Cited

U.S. PATENT DOCUMENTS

| 2009/0042601 A1* | 2/2009 | Wang et al. ................. 455/553.1 |
| 2009/0143078 A1* | 6/2009 | Tu et al. ..................... 455/456.3 |

* cited by examiner

*Primary Examiner* — Gary Mui
*Assistant Examiner* — Richard K Chang
(74) *Attorney, Agent, or Firm* — Lexyoume IP Meister, PLLC.

(57) ABSTRACT

Disclosed herein is a handover method and apparatus for providing mobile Internet Protocol Television (IPTV) service over wireless communication networks. The handover method includes checking whether the strength of a signal received from a first base station of a serving first wireless network falls within a predetermined first threshold range; if the strength of the signal falls within the range, checking whether the strength of a signal received from at least one base station of a second wireless network is higher than a second threshold value required for handover; estimating the velocity and direction of a Mobile Node (MN) using location information received from a satellite; predicting a handover target base station using the estimated velocity and estimated location information; and, if the predicted target base station is one of base stations having the second threshold value, performing handover to the target base station.

8 Claims, 8 Drawing Sheets

HANDOVER METHOD AND APPARATUS FOR PROVIDING MOBILE IPTV SERVICE OVER HETEROGENEOUS WIRELESS COMMUNICATION NETWORKS

CROSS-REFERENCE TO RELATED APPLICATION

This application claims priority to and the benefit of Korean Patent Application No. 10-2010-0015905 filed in the Korean Intellectual Property Office on Feb. 22, 2010, the entire contents of which are incorporated herein by reference.

BACKGROUND OF THE INVENTION

1. Field of the Invention

The present invention relates generally to a method and apparatus for providing mobile Internet Protocol Television (IPTV) service over heterogeneous wireless communication systems, and, more particularly, to a handover method and apparatus for providing mobile Internet Protocol Television (IPTV) service over heterogeneous wireless communication systems.

2. Description of the Related Art

Recently, due to the rapid growth of wireless communication technology, the demand for a variety of services using wireless communication technology, such as mobile IPTV service, is rapidly increasing. Meanwhile, mobile IPTV service must be provided in an environment in which a variety of existing mobile communication networks, such as a Wireless Local Area Network (WLAN), an IEEE 802.16 network and a 3GPP network, are working in conjunction with each other due to the characteristics of a wireless environment.

Currently, a variety of mobile communication networks, such as a WLAN, an IEEE 802.16 network and a 3GPP network, are provided. In order to provide efficient mobile IPTV service, the service must be provided seamlessly over a variety of communication networks.

Furthermore, in a wireless environment such as the environment of a mobile communication network, handover frequently occurs due to the mobility of a wireless terminal. Furthermore, due to the mobility of a terminal, not only handover within the same wireless network but also handover between heterogeneous networks must be performed.

Accordingly, mobile communication networks for supporting mobile IPTV service, handover between heterogeneous networks as well as handover within the same wireless network must be achieved.

In order to perform handover between different networks, that is, heterogeneous networks, as described above, a terminal must be equipped with one or more heterogeneous network interfaces and offer Quality of Service (QoS) and seamless service between wireless networks having different specifications.

Furthermore, in handover for wireless IPTV, a system must take into consideration the mobility of a terminal and the continuation of service between heterogeneous networks, and effective mobility management technology is required to provide stable service.

Such effective mobility management technology requires the provision of seamless handover between various types of wired and wireless networks. Accordingly, when a terminal using mobile IPTV service moves, effective mobility management technology enables seamless service to be provided by allowing a service user to continuously use data and a session being used over a serving access network over a target access network.

Mobile IPv6 (MIPv6), which is a next-generation Internet support technology, was developed to provide mobility. However, MIPv6 is a protocol simply related to the registration of the locations of an MN and the resetting of a path for the data packets of a current session. Since this protocol requires considerable delay time to detect the movement of a mobile node, configure the address of the MN and register the location of the mobile node, it cannot support real-time communication level mobility.

The Fast Handovers for Mobile IPv6 (FMIPv6) protocol similar to the above method was proposed more recently. However, in the FMIPv6 method, the exchange of signaling messages required for a mobile node to search for and identify an Access Router (AR) before handover, that is, during preparation for handover is necessary.

Due to the above procedure, the FMIPv6 method has problems in that delay occurs due to the exchange of signaling messages required to search for and identify an AR, so that the probability of operation in reactive mode is increased.

Furthermore, in the FMIPv6 method, when the mobile node operates in reactive mode, the mobile node retransmits a Fast Binding Update (FBU) message and receives a Fast Binding Acknowledgement (FBAck) message again.

As described above, in the FMIPv6 method, the reactive mode has the problem of causing handover delay time due to the retransmission of a message and the problem of requiring additional use of system resources as in the case of the transmission of a message.

SUMMARY OF THE INVENTION

Accordingly, the present invention has been made keeping in mind the above problems occurring in the prior art, and the present invention is intended to provide the following objects.

First, the present invention is intended to provide a handover method and apparatus for providing mobile IPTV service over heterogeneous wireless communication systems which is capable of preventing erroneous operation from occurring when handover for IPTV service is performed between heterogeneous wireless communication networks.

Second, the present invention is intended to provide a handover method and apparatus for providing mobile IPTV service over heterogeneous wireless communication systems which is capable of preventing an additional resource from being used when handover for IPTV service is performed between heterogeneous wireless communication networks.

Third, the present invention is intended to provide a handover method and apparatus for providing mobile IPTV service over heterogeneous wireless communication systems which is capable of improving handover success rate between heterogeneous wireless communication networks.

Fourth, the present invention is intended to provide a handover method and apparatus for providing mobile IPTV service over heterogeneous wireless communication systems which is capable of reducing the number of redundant messages when handover for IPTV service is performed between heterogeneous wireless communication networks.

In order to accomplish the above objects, the present invention provides a handover method for providing mobile IPTV service over wireless communication networks, the handover method including checking whether a strength of a signal received from a first base station of a serving first wireless network falls within a predetermined first threshold range in which handover is predicted to occur; if the strength of the signal received from the first base station falls within the range in which handover is predicted to occur, checking whether a strength of a signal received from at least one base station of a second wireless network is higher than a second threshold value required for handover; estimating the velocity and direction of a Mobile Node (MN) using location information received from a satellite; predicting a handover target base station using the estimated velocity and estimated location information; and, if the predicted target base station is one of base stations having the second threshold value, performing handover to the target base station.

Additionally, in order to accomplish the above objects, the present invention provides a handover apparatus for providing IPTV service over wireless communication networks, the handover apparatus including a first wireless unit for communicating with a first wireless network and detecting a strength of a signal from a base station of the first wireless network; a second wireless unit for communicating with a second wireless network and detecting a strength of a signal from at least one base station of the second wireless network; a Global Positioning System (GPS) reception unit for receiving location information from a satellite at predetermined time intervals; a threshold value buffer for storing a predicted handover threshold value range of the first wireless network and a threshold value of a handover satisfaction condition of the second wireless network; a velocity buffer for sequentially storing velocity information; and a control unit for, if the strength of the signal received from a serving base station and detected by the first wireless unit falls within the predicted handover threshold value range, performing control so as to check whether the strength of the signal received from the base station of the second wireless network is higher than the threshold value of the handover satisfaction condition by controlling the second wireless unit, to check whether the velocity and direction correspond to a direction to a target base station of the handover satisfaction condition of the second wireless network using the location information received from the GPS reception unit and the information stored in the velocity buffer, and to perform handover to the target base station if a condition for handover to the target base station of the second wireless network is satisfied.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
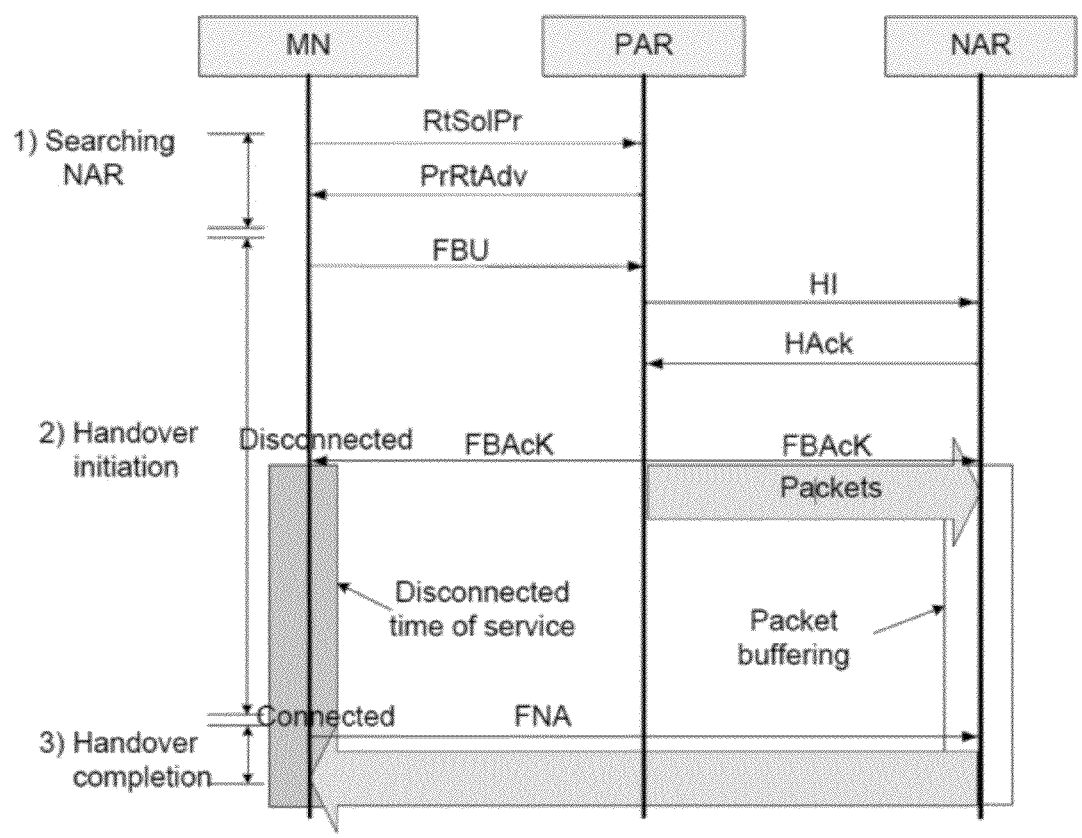
FIG. 1 is a diagram showing the flow of messages when an MN performs handover in predictive mode.

The present invention will be described in detail below with reference to the accompanying drawings. In the following description of the present invention, the parts of the description apparent to those skilled in the art will be omitted not to make the gist of the present invention obscure.

Furthermore, it should be noted that the terms used in the following description are used only to help the understanding of the present invention and different terms may be used by manufacturers or research groups to designate the same object.

In the present invention, a MN using IPTV service may move across wireless network regions having different communication specifications, and may be present in or passes through a region where a plurality of AP/PoS service ranges overlaps each other.

Meanwhile, due to the restrictive environment of wireless networks, accurate handover cannot be performed by considering only Received Signal Strength (RSS).

Accordingly, the present invention proposes a scheme for solving the problem of the vertical handover between heterogeneous networks.

In the following description of the present invention, a target domain includes wireless networks requiring increasing multimedia traffic capacities as for a mobile IPTV application, and uses the mobility of a MN (MN) as a decision factor to achieve efficient adaptation to a mobile environment.

Furthermore, the present invention provides a new Media Independent Handover Function (MIHF)-based fast vertical handover technique in order to provide, for example, seamless IPTV service over WiMAX and WLANs.

Furthermore, the technique provided by the present invention defines extended Media Independent Information Service (MIIS), including new L3 information, in order to support the prefixes of Access Routers (ARs) in heterogeneous networks.

The technique proposed by the present invention enables a target network to determine handover using an algorithm which receives the velocity and direction of an MN and RSS as input variables. Information about the velocity and direction of an MN may be obtained from the location data provided by a Global Positioning System (GPS) system.

Handover using a GPS is referred to as "location aided handover." Since handover using a GPS has been already described in various materials, such as ⌈X. Kumbuza and N. Ventura, "Using the Global Positioning System GPS to add Intelligence to Wireless Handover in WLAN," 2006 IEEE International Conference on Electro/information Technology, pp. 2326, May. 2006.⌋ and ⌈J. Pesola and S. Ponkanen, "Location Aided Handover in Heterogeneous Wireless Networks," *Wireless Personal Communications: An International Journal,* Vol. 30, Issue 2-4, pp. 195-205, September 2004.⌋ in detail, it is not described in detail here. In the location aided handover technique, an MN may receive location data every 50 ms.

The present invention is configured to predict the location of an MN in order to prevent the discontinuation of service and the deterioration of QoS due to handover. Using the prediction of the location of an MN, it is possible to ensure resources and perform advance handover in a cell to which an MN will be expected to be moved based on location prediction.

The technique according to the present invention handover is configured to acquire the velocity information of an MN, thereby not only predicting a preparation point of time but also reducing the overall time required to perform handover.

In the last of the present specification, the performance of the technique according to the present invention will be compared with that of MIPv6 and FMIPv6 using simulation. It will be seen that the technique according to the present invention exhibits excellent performance in terms of handover success rate and messaging overhead, particularly in the case where the velocity of an MN is relatively high and the number of APs is relatively large, compared to the existing techniques.

1. Related Works

The Media Independent Handover (MIH) described in IEEE 802.21 specifications defines a method of providing L2 information and other related network information to a higher layer in order to optimize handover between heterogeneous networks.

In FMIPv6, a network layer L3 must previously detect a symptom of handover from L2 so as to perform seamless handover. FMIPv6 can manage, determine and control the states of interfaces using an event service, a command service and an information service provided by the MIH. Furthermore, the services provided by the MIH support MIPv6 and other protocols.

MIPv6 technology supports mobility by binding the Home Address (HoA) of an MN and a New Care-of Address (NCoA) to be created in a target network to a home agent using a dual address system.

However, MIPv6 is a protocol simply related to the registration of the location of an MN and the resetting of the path of the data packets of a serving session.

After handover in the 2 layer, the MN itself detects its movement, sets an NCoA, sends a Binding Update (BU), and receives an acknowledgement thereof.

Since in practice, handover delay continues for a non-short period until the actual transmission and reception of packets to and from the NCoA, there are many problems supporting mobility at a level which satisfies real-time communication, as in Voice over IP (VoIP).

As described above, until the MIPv6 handover protocol is competed, service disturbance is caused to the MN. The Internet Engineering Task Force (IETF) standardized the Fast Handovers for Mobile IPv6 (FMIPv6) protocol in order to support high-velocity IPv6 handover. The FMIPv6 has two types of modes, that is, predictive mode and reactive mode.

Predictive mode is performed while an MN receives a Fast Binding Acknowledgement (FBack) message from a previous subnet before performing L2 handover.

In contrast, reactive mode is performed while an MN receives an FBack message from a new subnet.

In predictive mode, the mobility of an MN is predicted, and then a packet bound for the MN is sent to and stored in a target network during handover and sent to the MN after the completion of the handover. Accordingly, although an MIPv6 procedure is not completed, the service may be resumed, so that fast handover can be supported.

When the MN detects a new adjacent AR in a corresponding network, it acquires the IP address and subnet prefix information of a New Access Router (NAR) associated with an adjacent AR by exchanging Router Solicitation for Proxy (RtSolPr) and Proxy Router Advertisement (PrRtAdv) messages with a Previous Access Router (PAR) which is currently serving.

FIG. 1 is a diagram showing the flow of messages when an MN performs handover in predictive mode. Referring to FIG. 1, the flow of messages occurring when an MN performs handover in predictive mode will be described briefly.

First, the MN searches for an NAR by exchanging RtSolPR and PrRtAdv messages with a PAR. Thereafter, the MN sends an FBU for the NAR to the PAR. As a result, the PAR sends an HI message to the NAR found by the MN.

Then, the NAR sends Hack to the PAR. Thereafter, the PAR sends an FBAck to the MN and the NAR, so the channel between the MN and the PAR is disconnected during handover. Accordingly, the PAR provides a packet to be sent to the MN to the NAR, and the NAR buffers a packet received from the PAR.

That is, the NAR buffers a packet received from the PAR until communication with the MN is performed, that is, until the NAR sends an FNA to the FNA and a channel is set up, and sends the buffered packet to the MN when the handover is completed and the channel between the NAR and the MN is set up.

If the MN did not transmit an FBU before the handover or if an FBU was sent but handover was initiated before the reception of the FBAck message, the MN operates in reactive mode. When the MN operates in reactive mode, the MN sends the FBU message again and receives the FBAck message again.

Furthermore, reactive mode does not function to realize the reduction in handover delay, which is an advantage of the eFMIPv6, but functions to set up a tunnel after the MN has been moved and to reduce packet loss.

Accordingly, reactive mode has problems in that due to the retransmission of a message, handover delay time occurs and additional cost loss caused by message transmission is incurred.

The IEEE 802.21 standard is proposed to support a variety of handover procedures between heterogeneous networks. A Media Independent Handover Function (MIHF) provides service to upper and lower layers through well-defined Service Access Points (SAPs). The service provided by an integrated interface has no connection with an access technology.

The MIH protocol includes Media Independent Event Service (MIES), Media Independent Command Service (MICS) and Media Independent Information Service (MIIS), which are three principal services which support handover between heterogeneous networks.

Figure 2:
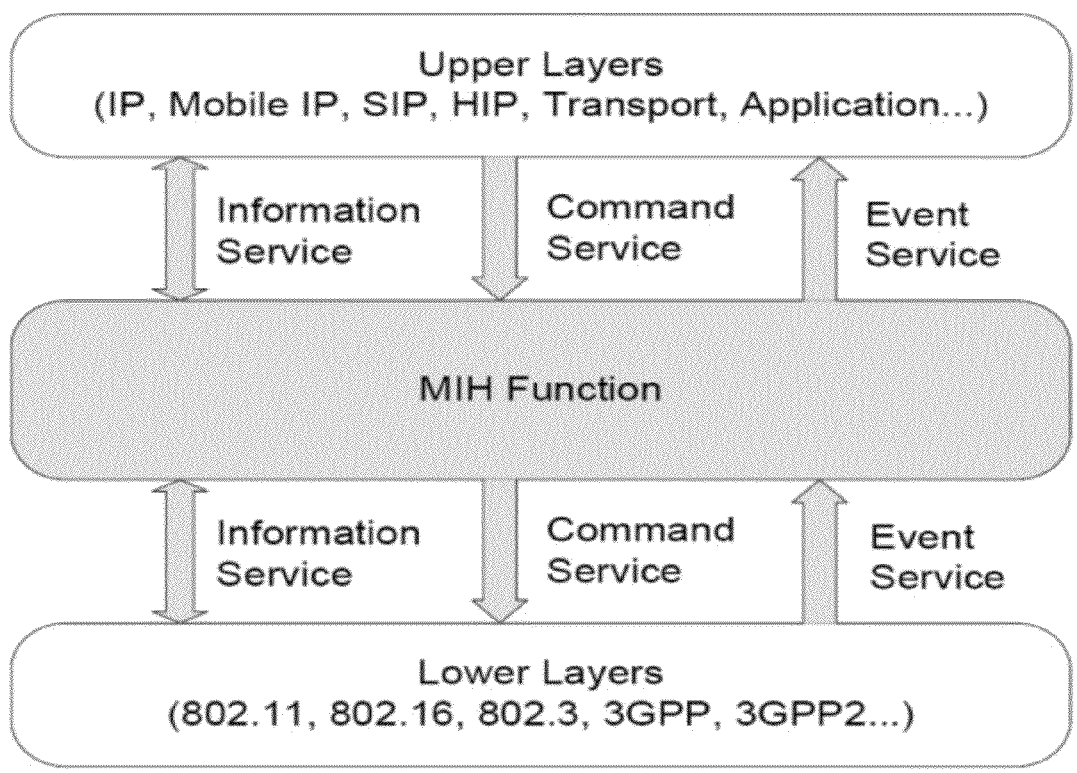
FIG. 2 is a diagram showing the structure of an MIHF.

FIG. 2 is a diagram showing the structure of an MIHF. The MIHF performs interfacing for transmission of information service, command service and event service between lower layers (802.11, 802.16, 802.3, 3GPP and 3GPP2 layers, ...) and higher layers (IP, MIP, SIP, HIP, Transport, and Application layers).

2. Concept of the Present Invention

In general, RSS is one of the principal factors of handover. A variety of handover algorithms using RSS information in order to reduce handover delay and handover failure rate have been already proposed.

Research into a method of recording the locations of an MN using RSS and acquiring trajectory information in order to support mobile IP handover having low delay, like the S-MIP, has been carried out.

The protocol is configured to start handover when the RSS for a serving BS is equal to or less than a previously defined threshold value. Although the MN is not far away from an AP, RSS may reach the threshold value due to the interference between overlapping channels or the increase in network traffic which influences signal strength.

In this case, the MN may perform handover to another AP regardless of the direction in which it is moving. The existing handover protocols cause such a problem because they do not take velocity into consideration in order to optimize performance.

Accordingly, in order to solve the problem, the present invention proposes an efficient handover scheme in which an MN takes the velocity and direction of movement as well as RSS into consideration in the selection of a network.

2-1. Link Layer Event

In the present invention, to enable handover between heterogeneous networks, L2 events are defined again, and a dual mode interfacing MN is used to determine the start of handover using RSS information.

Here, an event trigger predicts the probability of advance handover, and enables the MN to receive information about an adjacent network PoA from the MIIS.

Accordingly, predictive mode may be performed, and RSS is used as a condition for handover. Whether to use an event trigger from L2 is determined based on a previously defined RSS threshold value.

The L2 events for providing notification of a current link state include Link Up (LU), Link Coming Up (LCU), Link Going Down (LGD), Link Down (LD), and Link Detected and Link Parameter Change.

An event trigger on which importance is placed by the present invention is LGD, since this is an important factor for ensuring QoS-supporting handover.

In the case where only the minimum QoS is satisfied because the MN moves away from a currently coupled AP and moves out of a service area, RSS is reduced and L2 triggers an LGD event.

In order to detect movement immediately after L2 handover has been completed, the proposed technique utilizes link layer state information indicative of L2 coupling and release between the MN and the AP.

2-2. Network Environment

Figure 3:
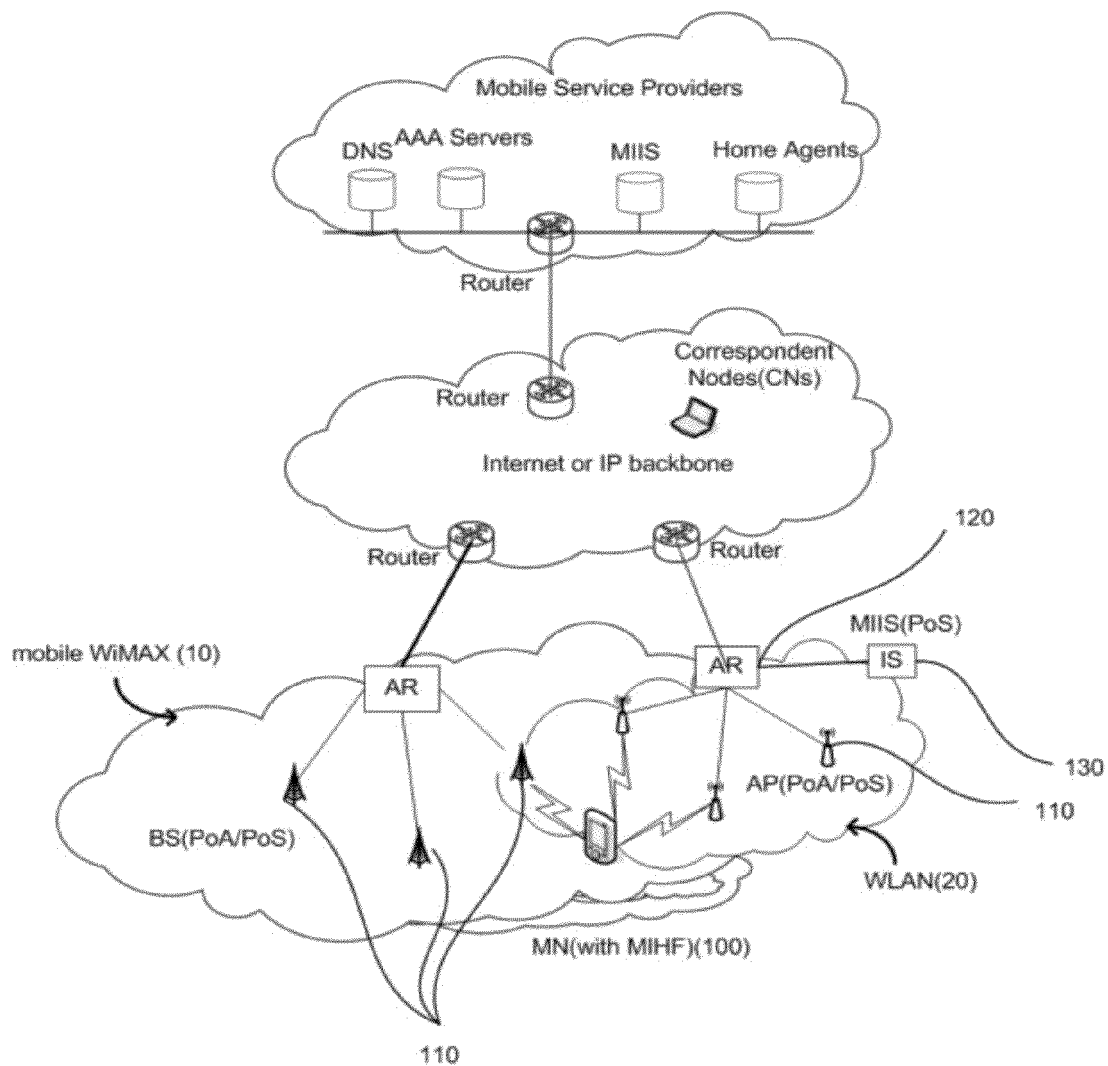
FIG. 3 is a diagram showing an example of an IEEE 802.21 system to which an improved method over FMIPv6 is applied in a heterogeneous network environment according to the present invention.

FIG. 3 is a diagram showing an example of an IEEE 802.21 system to which an improved method over FMIPv6 is applied in a heterogeneous network environment according to the present invention.

Referring to FIG. 3, the operation of the elements of the system to which the improved method over FMIPv6 is applied in a heterogeneous network environment will be described below.

First, it is assumed that an MN 100 is a multi-mode MN capable of MIH service. With regard to ARs or BSs 110 communicating with the MN 100, a Point of Service (PoS) for providing service communicates with the MN 100 via a wireless channel, and a method of communicating with the MN 100 follows a corresponding wireless network standard protocol.

That is, an AR BS 110 located in a mobile WiMAX network 10 communicates with the MN 100 in compliance with the WiMAX wireless network protocol, and an AR AP 110 of a WLAN 20 communicates with the MN 100 in compliance with the WLAN protocol.

That is, all of the ARs and BSs of the networks function as PoSs. Accordingly, the BSs and ARs 110 are connected to a wired network through ARs.

Thereafter, an Information Server (IS) 130 manages information about PoSs, such as BSs and ARs, and/or information about adjacent networks which may be located in a core network. That is, the IS 130 performs functions of storing and managing information about BSs and ARs and adjacent networks.

Furthermore, the IS 130 has an MIIS function, and classifies and stores information about the L2 and L3 of adjacent networks collected using the MIIS function according to the characteristics. Since the present invention is configured to use L2 connection information provided by the MIIS in the FMIPv6 scheme, handover delay caused by searching for a wireless AP is reduced. Details of this will be described below.

It is assumed that the MN 100 having different interfaces is located in an area where the regions of heterogeneous wireless networks overlap each other, as shown in FIG. 3. As shown in FIG. 3, the service coverage region of the Mobile WiMAX wireless network 10 includes the service region of the WLAN 20.

In this case, when the MN 100 moves to the region of the WLAN 20 while receiving service in the region of the Mobile WiMAX wireless network 10, it is necessary for the MN 100 to perform vertical handover from a BS of the mobile WiMAX wireless network 10 from which a packet is received to an AP of the WLAN.

This will be described with reference to FIG. 3. There is a case where the MN 100 must receive service from an AP of the WLAN 20 because the MN 100 enters the region of the WLAN while receiving service from a BS of the Mobile WiMAX wireless network 10 at a location where the Mobile WiMAX wireless network 10 overlaps the WLAN 20.

In this case, handover between heterogeneous networks must be performed, in which case an accurate handover time point must be determined.

Currently, the MN 100 may receive signals from the plurality of APs of the WLAN 20. However, since the MN 100 can connect with only one AP, a method for selecting the optimum AP is required.

Accordingly, the MN 100 may use variation in RSS, and the variation in RSS can be dynamically detected using an event trigger based on the IEEE 802.21 standard.

Furthermore, when the velocity and direction of the MN 100 as well as the strength of a signal received from a plurality of APs by the MN 100 are all taken into consideration, handover in a wireless environment sensitive to various surrounding environments can be successfully performed.

2-3. Determination Algorithm of MN

Figure 4:
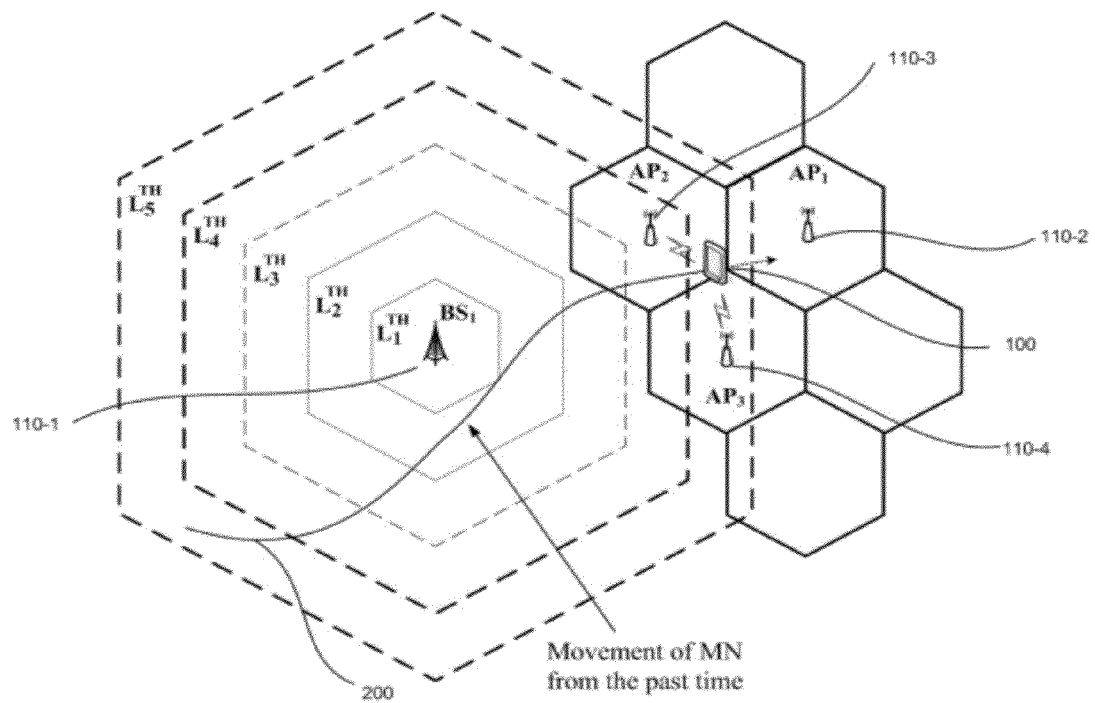
FIG. 4 is a diagram illustrating an example of the vertical handover of an MN in heterogeneous networks including a mobile WiMAX network and a WLAN.

FIG. 4 is a diagram illustrating an example of the vertical handover of an MN in heterogeneous networks including a mobile WiMAX network and a WLAN.

In FIG. 4, an AR of a mobile WiMAX network is assigned reference numeral 110-1, the first to third APs of a WLAN are assigned reference numerals 110-2, 110-3 and 110-4, and the path of an MN 100 is assigned reference numeral 200.

That is, it is assumed that the MN 100 moves from a region where only signals from the AR 110-1 of the mobile WiMAX network can be received to a region where signals from the APs 110-2, 110-3 and 110-4 of the WLAN can be received.

Furthermore, it is assumed that for ease of understanding, the strength of a signal is reduced in the direction away from the AR of the mobile WiMAX network and in the form of hexagonal cells around the AR. That is, the strength of a signal has a first threshold value $L_1^{TH}$ at the closest distance to the AR and a fifth threshold value $L_5^{TH}$ at the farthest to the AR.

Furthermore, it is assumed that the MN 100 enters into the WLAN along the path 200 and is then located at a location where it is possible to measure the strings of signals from the APs 110-2, 110-3 and 110-4.

That is, the MN 100 is located in a region requiring handover between a fourth threshold value $L_4^{TH}$ and a fifth threshold value $L_5^{TH}$. The threshold values may be influenced by the distance from the AR or a channel environment as described above, and are determined depending on the strength of a signal received from the AR.

When the MN 100 which receives service from the AR 110-1 of the mobile WiMAX network is located at a location between the fourth threshold value and the fifth threshold value while moving along the path 200, QoS is not satisfied due to decrease in the intensity of signal.

Accordingly, before making preparation for handover, the MN 100 obtains predicted velocity at the next point of time using the past velocity value of the MN 100. A method of predicting the velocity of the MN 100 requires the initial predicted value of the velocity of the MN 100.

In order to determine an initial predicted value, the present invention is configured to calculate an average in previous periods adjacent to a current period of time, that is, recent periods, and use it as the predicted value.

Here, a weight is reduced in the direction of the passage of time, that is, in the direction from a past period to a recent period. Furthermore, a weight value allocated to past material is caused to be reduced exponentially.

Using this method, a higher weight value is allocated to the recent movement of the MN 100, so that the variation in past velocity close to the present time can be sensitively reflected. Furthermore, in the present invention, the velocity and direction information of the MN 100 is acquired through a GPS.

The velocity and direction of the MN 100 at the next point of time can be predicted based on the velocity and direction information acquired as described above.

This may be expressed using the following Equation 1:

$$V_t = \alpha v_t + (1-\alpha) V_{t-1} \quad (1)$$

where $V_t$ is the average velocity of the MN 100 over time, and $v_t$ is the velocity of the MN 100 at time t.

Equation 1 is generalized as the following Equation 2:

$$V_t = \alpha \Sigma_{i=0}^{k} (1-\alpha)^i V_{t-1} \quad (2)$$

where k is a constant indicative of the number of velocity data values obtained at previous times on the basis of current time t, and α is a smoothing constant having a value between 0 and 1 and can be determined through a large number of simulations.

When the velocity of the MN 100 is obtained using the above-described method, the time at which preparation for handover will be made can be predicted, and the time taken to perform handover can be reduced.

For example, when the average velocity of the MN 100 is higher than the current velocity of the MN 100, it can be predicted that the velocity of the MN 100 at a point of time for handover or a point of time after the current time is lower than the current velocity.

If the velocity of the MN 100 as well as the moving direction of the MN 100 can be found, an AP to which the MN 100 moves in a WLAN environment in which a plurality of APs coexists can be predicted.

That is, when a predicted path can be found in a direction in which the MN 100 moves, a previous resource scheduling range can be reduced for a plurality of overlapping networks, so that handover can be performed without the waste of resources.

Accordingly, in the present invention, the moving direction of the MN 100 can be predicted using the following Equations 3 and 4 as a method of predicting the moving direction of the MN 100:

$$D_t = \beta d_t + (1-\beta) D_{t-1} \quad (3)$$

$$= \beta \sum_{j=0}^{k} (1-\beta)^j d_{t-j}$$

where D is the predicted direction of the MN at next time t, $d_t$ is the moving direction of the MN at current time t, and β is a smoothing constant having a value between 0 and 1 and can be determined through a large number of simulations.

$$\cos^{-1}(d_t * d_{t-1}) > \frac{\pi}{2} \quad (4)$$

Furthermore, if in Equation 4, the variation between the moving direction of the MN 100 at the previous time t-1 and the direction at the current time t is greater than π/2, the MN 100 is determined to move in the direction opposite to a current direction, that is, in a backward direction.

In the present invention, the variation in movement is detected by obtaining the velocity of the MN 100 in each set time period using an adaptive timer depending on the velocity of the MN 100.

When the adaptive timer is used as described above, the number of unnecessary velocity measurements can be reduced in the case where the velocity of the MN 100 is constant and low.

Using the above-described method, information about the movement of the MN 100 can be acquired in the form of information about variation in velocity and direction over time.

Furthermore, the information about the velocity and direction of the MN 100 is acquired using information received from a GPS at periodic intervals. Furthermore, the velocity and the direction may vary over time.

Accordingly, the time at which location information is determined needs to vary depending on the velocity of the MN 100. That is, since the moving distance of the MN 100 is greatly influenced by the velocity, the period of the timer is set with a focus only on the variation in velocity, as shown in the following Equation 5:

$$T_{new}^P = T_{previous}^P * \frac{1}{\frac{v_t}{v_{t-1}}} \quad (5)$$

where $T_{new}^P$ is the new period of the timer reflecting variation in velocity and is calculated by multiplying a previous timer period by $1/v_t/v_{t-1}$, $v_t$ is the velocity of MN 100 at current time, and $v_{t-1}$ is the velocity at previous time.

If the current velocity of the MN 100 is higher than the previous velocity, the value of the period of the timer is reduced.

That is, the variation in the velocity of the MN 100 can be accurately detected only in the case where the period of the timer is adjusted to a small value when the velocity of the MN 100 increases and the period of the timer is adjusted to a large value when the velocity of the MN 100 decreases. However, the period of the timer must not be shorter than 50 ms. The reason for this is that location information received from a GPS takes at least 50 ms.

However, if the time of location information received from a GPS varies, the least amount of time must be varied accordingly.

When the period at which the location information of the MN 100 is updated is set considering the velocity of the MN, the variation caused by the variation in the velocity of the MN 100 can be more sensitively reflected.

Furthermore, the setting of the period enables the handover time and the location information of the moving MN 100 to be accurately determined, and is used to measure the RSS value.

The adaptive timer adjusts the period in which the predicted values of the velocity and direction of the MN 100 are calculated. In the case where the RSS related to a target BS is considerably higher than that related to a currently serving BS, the period is set to a short period.

Since the procedure for predicting the location of the MN 100 considering velocity and direction is the same as that described above, a description thereof will not given here.

Figure 5:
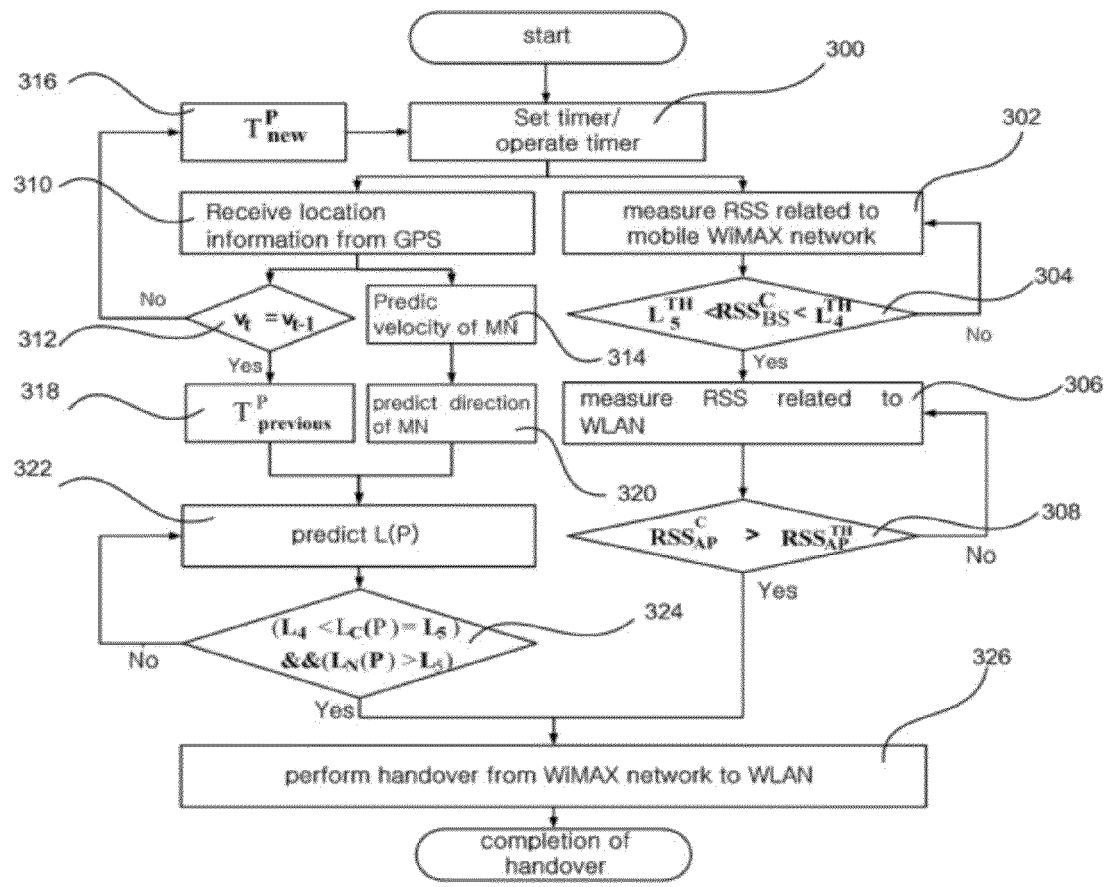
FIG. 5 is a control flowchart illustrating a procedure in which an MS moving between heterogeneous networks selects a network according to the present invention.

FIG. 5 is a control flowchart illustrating a procedure in which an MS moving between heterogeneous networks selects a network according to the present invention.

Referring to FIG. 5, the procedure in which an MN moving between heterogeneous networks, in particular, between a WiMAX network and a WLAN, selects a network according to the present invention will be described in detail below.

First, at step 300, an MN 100 adaptively sets a timer for predicting velocity and direction so as to perform handover as described above, and operates the set timer.

In the case of initial timer operation, the timer value may be set to a predetermined time value. As the timer is set and operated, the MN 100 performs steps 302 and 310. At step 302, the MN 100 measures RSS related to a mobile WiMAX network.

RSS is the strength of a signal received from a BS of the mobile WiMAX network as described above. After measuring the strength of the received signal, the MN 100 determines whether the measured RSS has a value between the fifth threshold value and the fourth threshold value at step 304.

That is, as described in conjunction with FIG. 4, whether the strength of the signal received from the BS of the mobile WiMAX network falls between the outermost and second outermost of the preset threshold values.

If, as a result of the determination at step 304, the location of the MN 100 satisfies the above condition, the MN 100 performs step 306.

In contrast, if the condition of step 304 is not satisfied, the process proceeds to step 302, and then checks the strength of a signal received from the BS of the mobile WiMAX network continuously or at predetermined intervals and determines whether the checked strength satisfies the condition of step 304.

The condition of step 304 refers to the condition in which required QoS cannot be met, so that handover must be performed. Accordingly, at step 306, the MN 100 measures the strength of a signal received from an AP of the WLAN. That is, RSS is measured.

Thereafter, the MN 100 checks whether the strength of a signal currently received from the AP of the WLAN is higher than that of a signal required for handover, that is, the value of $RSS_{AP}^{TH}$. If, as a result of the checking at step 308, the strength of the received signal is higher than a threshold value required for handover, handover from the mobile WiMAX network to the WLAN is performed at step 326.

Meanwhile, the MN 100 receives the location information of the MN 100 from a GPS at step 310 at the same time that it performs step 302. Thereafter, the MN 100 performs steps 312 and 314. At step 314, the MN 100 predicts its own velocity.

The velocity of the MN 100 may be predicted using location information received at the latest time when the MN 100 received information from a GPS and current location information.

Furthermore, at step 312, whether the velocity at the previous time and the velocity at current time are compared with each other is checked. If the velocities are the same, the timer value is set equal to the previous value at step 318.

In contrast, if the previous velocity is different from the current velocity, the process proceeds to step 316 and then the timer value is changed to fit the varied velocity. Here, with regard to the variation in velocity, when velocities fall within the same predetermined velocity range, they may be determined to be the same.

For example, assuming that the previous velocity is 5 km/h, the current velocity is 4 km/h and the same velocity ranges are set to a range from 1 km/h to 10 km/h and a range from 10 km/h to 30 km/h, the timer may be set for the same timer value in the case where the current velocity is 4 km/h and the previous measured velocity is 5 km/h.

Another method may be configured to assign different weights to respective velocities and determine a timer value by performing operation between velocity and weight. The setting of the timer may be performed using various methods, and the present invention is not limited to a particular method of setting the timer.

After steps 318 and 320 have been performed as described above, the MN 100 predicts the location of the MN 100 at step 322. Thereafter, the MN 100 checks whether a current location falls between the fourth and fifth threshold values of the mobile WiMAX network which have been described in conjunction with FIG. 4 and whether it is predicted that a future location will depart from the range within the fifth threshold value at step 324. If the above-described two conditions are satisfied, the process proceeds to step 326. Otherwise the process proceeds to step 322.

Here, if both the conditions of steps 302 to 308 and the conditions of steps 310 to 324 are satisfied, step 326 is performed. Otherwise handover from the mobile WiMAX network to the WLAN is not performed unlike at step 326.

That is, handover from the mobile WiMAX network to the WLAN is performed only when RSS related to the WLAN must be higher than a reference value and then satisfies a handover condition, the location of the MN 100 must fall within the threshold value range within which handover is predicted, and a future location is a location requiring handover.

Accordingly, in this case, the MN 100 performs handover from the mobile WiMAX network to the WLAN at step 326, or may predict handover to the WLAN and then prepare for the handover.

As described above, parameters required for the handover from the mobile WiMAX network to the WLAN, that is, the selection of a network, may be listed and exemplified as shown in the following Table 1:

TABLE 1

| Parameter | Description |
|---|---|
| $T_{new}^{P}$ | new timer period |
| $T_{previous}^{P}$ | previous timer period |
| $L_{x}^{TH}$ | layers divided according to RSS threshold value related to BS |
| $L(P)$ | predicted location of MN |
| $L_{N}(P)$ | next predicted location of MN |
| $L_{C}(P)$ | RSS threshold value of WLAN AP |
| $RSS_{AP}^{TH}$ | current RSS threshold value related |

TABLE 1-continued

| Parameter | Description |
|---|---|
| | to WLAN AP |
| $RSS_{BS}^{C}$ | current RSS value related to BS |
| $RSS_{AP}^{C}$ | current RSS value related to AP |

In summary, the MN 100 determines whether RSS related to a BS of the mobile WiMAX network and RSS related to a target AP satisfy the three conditions for handover.

A first condition is that the RSS related to the BS of the mobile WiMAX network falls within a predefined range between the fourth and fifth threshold values. Furthermore, the RSS related to the current WLAN must be higher than the predefined threshold value.

In this case, the conditions for handover are partially satisfied. If this condition is not satisfied, the MN 100 checks RSS until the timer is terminated. Thereafter, the predicted location of the MN 100, which is another condition for handover, must be found.

The predicted location may be determined using the above-described Equations 2 and 3. The handover conditions are that when the MN 100 acquires distance information based on RSS, the current location of the MN 100 falls between the fourth threshold value and the fifth threshold value and, at the same time, the next predicted location falls out of the range within the fifth threshold value.

In this case, the MN 100 may determine a point of time for handover, and prepares for handover only when the above two conditions are satisfied.

Here, the transmission of packets using tunneling can be prepared for in advance by checking a router to which the AP is connected. This has the advantage of reducing messaging overhead required for router searching and handover preparation.

Figure 6:
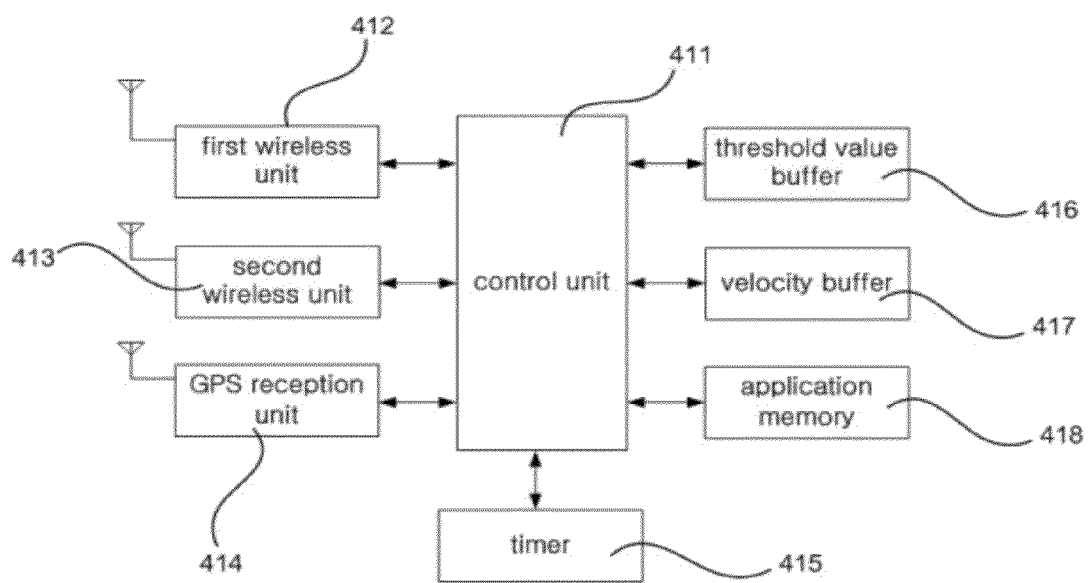
FIG. 6 is a block diagram showing an MN which performs handover between heterogeneous networks according to the present invention.

FIG. 6 is a block diagram showing an MN which performs handover between heterogeneous networks according to the present invention. Referring to FIG. 6, the operations of the function blocks of the MN according to the present invention will be described below. It should be noted that FIG. 6 shows only a block configuration for performing handover according to the present invention.

A first wireless unit 412 communicates with a first wireless network using a set method, and the first wireless network may be, for example, a mobile WiMAX network.

Accordingly, the first wireless unit 412 may communicate with the first wireless network using the preset method, and measure the strength of a signal (that is, RSS) received from the first wireless network. Furthermore, the first wireless unit 412 may include a plurality of antennas in some cases. The RSS measured as described above is provided to a control unit 411.

A second wireless unit 413 communicates with a second wireless network using a preset method, and the second wireless network may be, for example, a WLAN. Accordingly, the second wireless unit 413 may communicate with the second wireless network using the predetermined method, and may measure the strength of a signal (that is, RSS) received from the second wireless network.

Furthermore, the second wireless unit 413 may include a plurality of antennas in some cases, and may receive signals from different ARs through the respective antennas. The RSS measured as described above is provided to the control unit 411.

The GPS reception unit 414 receives location information for estimating information corresponding to the location of the MN from a satellite, and provides the received information to the control unit 411.

A timer 415 is set to one of the predetermined times depending on the velocity of the MN and is then operated, as described above, and provides time-off information for receiving location information to the control unit 411.

A threshold value buffer 416 stores the threshold values of the first wireless network, for example, first to fifth threshold values, and, at the same time, stores threshold values for handover to the second wireless network. The threshold values stored in the threshold value buffer 416 are provided to the control unit 411 when handover is measured.

A velocity buffer 417 is memory for storing a predetermined number of pieces of velocity information, and accumulatively stores velocity data to determine the moving direction of the MN and to predict the future velocity of the MN and provides it to the control unit 411 when handover is determined according to the present invention. Furthermore, the velocity buffer 417 may store acquired location information together with velocity information using a signal received from the GPS reception unit 414.

Application memory 418 stores control programs required for a process for controlling a handover operation according to the present invention, and control programs required for communication with the respective wireless networks.

The control unit 411 performs basic control for the communication of the MN, and controls handover between heterogeneous networks according to the present invention. That is, the control unit 411 performs overall control based on the control flow of the above-described FIG. 5. In greater detail, the control unit 411 acquires information about the location of the MN, and calculates velocity and moving direction using the acquired location information and previous location information.

Furthermore, the control unit 411 stores the calculated velocity of the MN in the velocity buffer 417, and reads stored data when necessary. Moreover, the control unit 411 calculates a timer value to be set depending on variation in velocity, and controls the setting of the timer 415 using the calculated timer value.

2-4. Verification

The performance of the vertical handover technique according to the present invention will be compared with that of the other techniques using computer simulation below. The technique according to the present invention will be compared with a technique using only RSS, which is one of the other techniques. Related simulation parameters are defined as shown in the following Table 2:

TABLE 2

| Parameter | Value |
|---|---|
| AP radius | 50 m |
| AP overlapping region | 15 m |
| Number of APs in overlapping area | 3 |
| $RSS_{AP}^{TH}$ | −76 dBm |
| $T_{new}^{P}$ | 50 ms~200 ms |
| Distance of each $L_x^{TH}$ | 1 km |
| L2 scanning time | 400 ms~800 ms |

First, the assumptions for the evaluation of the performance of the present invention, that is, simulation conditions, will be described below. It is assumed that an MN 100 is a dual mode MN having separate interfaces for supporting communication between heterogeneous networks. The service range of a mobile WiMAX is set to 5 km, and is divided into five layers according to RSS.

Furthermore, the overlapping area of RSS is assumed to be 15 m, and the maximum number of APs from which the MN can obtain information about RSS is limited to 3. It is assumed that each AP is connected to another AR.

Furthermore, it is assumed that an AP of a WLAN has a wireless Internet available area having a radius of 50 m. Meanwhile, the WLAN L2 scanning delay time is set to 400~800 ms based on the paper [Q. B. Mussabbir, and W. Yao, "Optimized FMIPv6 Handover Using IEEE802.21 MIH Services," in Proc. of MobiArch 2006, pp. 43-48, 2006].

The location information of the MN provided by a GPS is determined depending on the period of the timer, and the timer has a value equal to or greater than 50 ms. It is assumed that the MN has velocity irregularly varying between 0 and 18.

Figure 7:
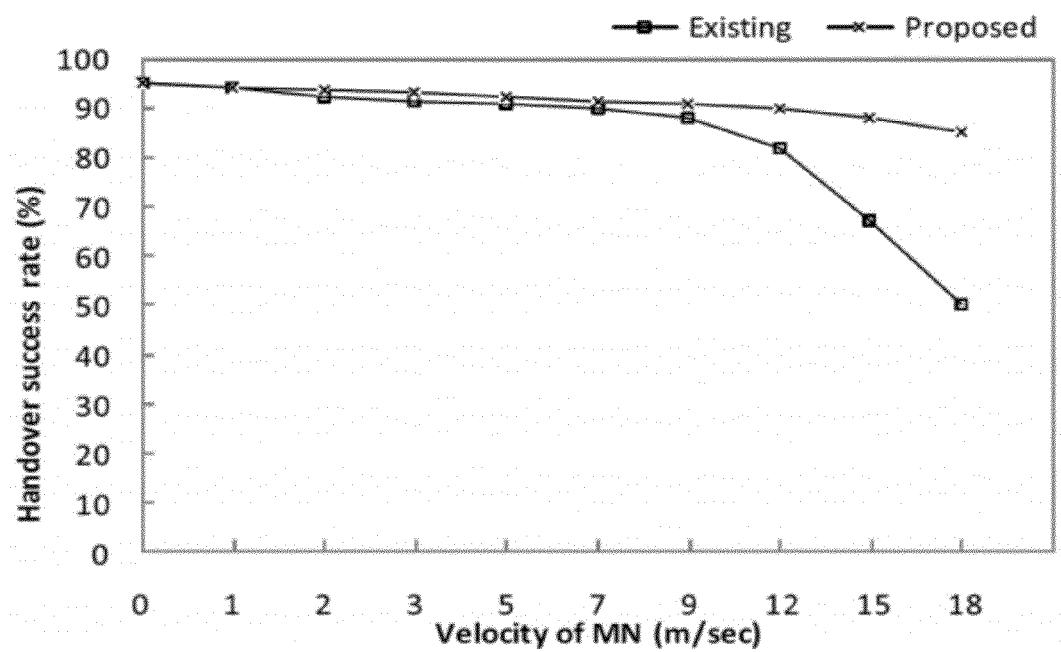
FIG. 7 is a graph showing simulation of the correlation between variation in the velocity of an MN and handover success rate.

When the correlation between variation in the velocity of the MN 100 and handover success rate is simulated under the above-described simulation conditions, results can be obtained as shown in FIG. 7. As can be seen from FIG. 7, since the existing method considering only RSS selects an AP having the highest signal strength, handover can be inaccurately performed due to various factors, such as the reduction in RSS resulting from variation in the environment and the variation in the velocity of the MN 100.

Furthermore, as can be seen from FIG. 7, the method according to the present invention considering the velocity and direction of the MN 100 and RSS exhibits excellent performance compared to another technique. As the velocity of the MN 100 increases, the improvement of the performance of the method of the present invention increases.

Figure 8:
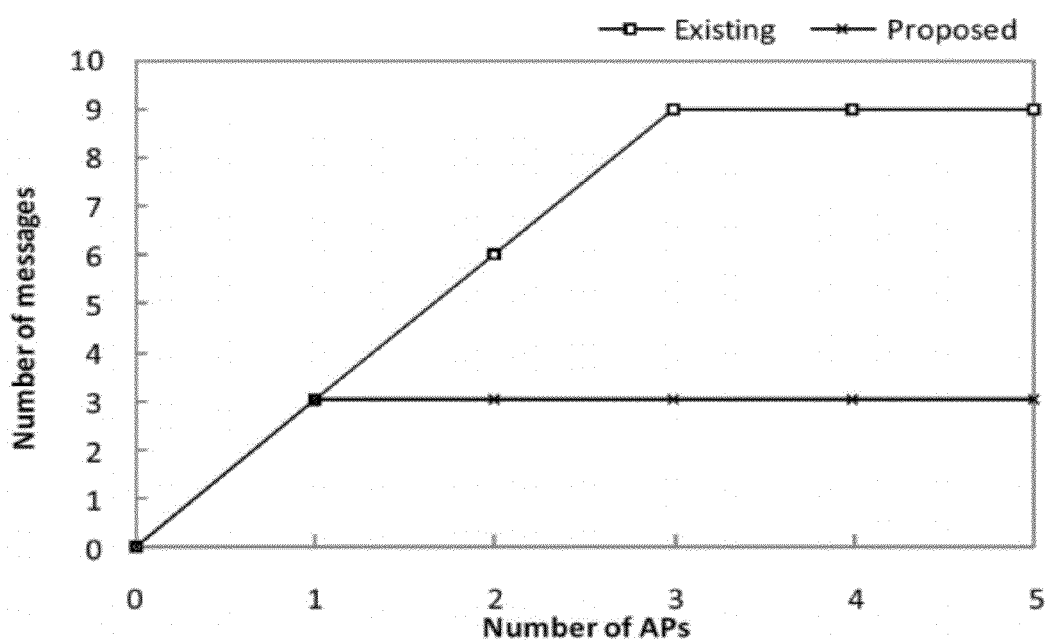
FIG. 8 is a graph illustrating the correlation between the number of APs and the number of crated messages, including RtSolPr, PrRtAdr and FBU messages.

FIG. 8 is a graph illustrating the correlation between the number of APs and the number of crated messages, including RtSolPr, PrRtAdr and FBU messages.

The number of messages required to ensure resources varies depending on the number of APs that the MN requires to ensure resources so as to perform handover. FIG. 8 indicates that the handover method according to the present invention requires a smaller number of messages than the existing technique.

Furthermore, the performance of the handover method of the present invention is improved in proportion to the number of APs. In FMIPv6, when handover is performed inaccurately, the probability of predictive mode being performed is reduced, and switching to reactive mode is required. As a result, the transmission of additional messages is required.

Compared with the existing technique, the handover method according to the present invention takes into consideration not only RSS but also the velocity and direction of a MN when selecting an AP to which handover will be performed. Using this method, the probability of the MN preparing for handover in predictive mode before the L2 link is released is increased.

As a result, the number of messages required for handover between the mobile WiMAX and the WLAN is reduced. In other words, by accurately predicting the next AP to which handover will be performed, the need for the MN to send an FMIPv6 Duplicate Address Detection (DAD) message to all adjacent routers is eliminated. That is, a DAD message is sent only to a single router, which considerably reduces message overhead and decreases cost.

The handover method according to the present invention has the advantage of predicting the location of an MN considering the velocity and direction of the MN and RSS, unlike the existing techniques. Furthermore, the handover method according to the present invention can accurately predict the movement of an MN to a specific AP, thereby improving the handover success rate compared to the techniques considering only RSS.

That is, the handover method according to the present invention does not perform handover based only on RSS greatly varying in a wireless environment, and prepares only for handover to a single AP, thereby providing the advantage of preventing the retransmission or redundant transmission of a message of an MN located in a region where signals from various APs overlap each other.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A handover method for providing mobile Internet Protocol Television (IPTV) service over wireless communication networks, the handover method comprising:
checking whether a strength of a signal received from a first base station of a serving first wireless network falls within a predetermined first threshold range in which handover is predicted to occur;
if the strength of the signal received from the first base station falls within the range in which handover is predicted to occur, checking whether a strength of a signal received from at least one base station of a second wireless network is higher than a second threshold value required for handover;
estimating velocity and direction of a Mobile Node (MN) using location information received from a satellite;
predicting a handover target base station using the estimated velocity and estimated location information; and
if the predicted target base station is one of base stations having the second threshold value, performing handover to the target base station,
wherein the estimation of velocity and direction is performed by predicting velocity and direction using a predetermined number of pieces of information selected from among location information currently from a satellite and recent location information previously received from the satellite, and
wherein the prediction of the velocity and direction is performed using the following Equations:

$$V_t = \alpha \sum_{i=0}^{k} (1-\alpha)^i V_{t-1}$$

$$D_t = \beta d_t + (1-\beta) D_{t-1}$$

$$= \beta \sum_{j=0}^{k} (1-\beta)^j d_{t-j}$$

where k is a constant indicative of the number of velocity data values obtained at previous times on the basis of current time t, α is a smoothing constant having a value between 0 and 1 and can be determined through a large number of simulations, D is a predicted direction of the MN at next time t, $d_t$ is a moving direction of the MN at current time t, and β is a smoothing constant having a value between 0 and 1 and can be determined through a large number of simulations.

2. The handover method as set forth in claim 1, wherein the first wireless network is a WiMAX network and the second wireless network is a Wireless Local Area Network (WLAN).

3. The handover method as set forth in claim 1, wherein the reception of the location information from the satellite is performed at time intervals set in a timer.

4. The handover method as set forth in claim 3, wherein a value of the timer is set such that the value of the timer is maintained if currently estimated velocity and most recently estimated velocity are equal to each other and such that the value of the timer is adaptively set depending on changed velocity if the velocity is changed.

5. A handover apparatus for providing IPTV service over wireless communication networks, the handover apparatus comprising:
- a first wireless unit for communicating with a first wireless network and detecting a strength of a signal from a base station of the first wireless network;
- a second wireless unit for communicating with a second wireless network and detecting a strength of a signal from at least one base station of the second wireless network;
- a Global Positioning System (GPS) reception unit for receiving location information from a satellite at predetermined time intervals;
- a threshold value buffer for storing a predicted handover threshold value range of the first wireless network and a threshold value of a handover satisfaction condition of the second wireless network;
- a velocity buffer for sequentially storing velocity information; and
- a control unit for, if the strength of the signal received from a serving base station and detected by the first wireless unit falls within the predicted handover threshold value range, performing control so as to check whether the strength of the signal received from the base station of the second wireless network is higher than the threshold value of the handover satisfaction condition by controlling the second wireless unit, to check whether the velocity and direction correspond to a direction to a target base station of the handover satisfaction condition of the second wireless network using the location information received from the GPS reception unit and the information stored in the velocity buffer, and to perform handover to the target base station if a condition for handover to the target base station of the second wireless network is satisfied, wherein the checking of the velocity and direction by the control unit is performed by estimating the current location information using the information received through the GPS reception unit and predicting the velocity and direction using the current location and the previous location information stored in the velocity buffer, and wherein the prediction of the velocity and direction is performed using the following Equations:

$$V_t = \alpha \sum_{i=0}^{k} (1-\alpha)^i V_{t-1}$$

$$D_t = \beta d_t + (1-\beta) D_{t-1}$$

$$= \beta \sum_{j=0}^{k} (1-\beta)^j d_{t-j}$$

where k is a constant indicative of the number of velocity data values obtained at previous times on the basis of current time t, $\alpha$ is a smoothing constant having a value between 0 and 1 and can be determined through a large number of simulations, D is a predicted direction of the MN at next time t, $d_t$ is a moving direction of the MN at current time t, and $\beta$ is a smoothing constant having a value between 0 and 1 and can be determined through a large number of simulations.

6. The handover apparatus as set forth in claim 5, wherein the first wireless network is a WiMAX network and the second wireless network is a WLAN.

7. The handover apparatus as set forth in claim 5, further comprising a timer for determining driving time of the GPS reception unit.

8. The handover apparatus as set forth in claim 7, wherein the control unit sets a value of the timer such that the value of the timer is maintained if currently estimated velocity and most recently estimated velocity are equal to each other and such that the value of the timer is adaptively set depending on changed velocity if the velocity is changed.

* * * * *